United States Patent [19]

Yeschick

[11] Patent Number: 4,916,746
[45] Date of Patent: Apr. 10, 1990

[54] IMAGE ROTATION CIRCUIT

[75] Inventor: Waldemar E. Yeschick, Herkimer, N.Y.

[73] Assignee: International Computers Limited, London, England

[21] Appl. No.: 354,737

[22] Filed: May 22, 1989

Related U.S. Application Data

[63] Continuation of Ser. No. 104,504, Oct. 5, 1987, abandoned.

[51] Int. Cl.⁴ .............................................. G06K 9/32
[52] U.S. Cl. .................................. 382/46; 340/727
[58] Field of Search .................... 382/46, 44; 340/727; 364/559, 564

[56] References Cited

U.S. PATENT DOCUMENTS

| | | | |
|---|---|---|---|
| 3,811,110 | 5/1974 | Inose et al. | 382/46 |
| 4,052,699 | 10/1977 | Micka et al. | 382/46 |
| 4,168,488 | 9/1979 | Evans | 382/46 |
| 4,225,929 | 9/1980 | Ikeda | 340/727 |
| 4,593,407 | 6/1986 | Konishi et al. | 382/46 |
| 4,636,783 | 1/1987 | Omachi | 340/727 |
| 4,736,442 | 4/1988 | Kornfeld | 382/46 |

Primary Examiner—Leo H. Boudreau
Assistant Examiner—Joseph Mancuso
Attorney, Agent, or Firm—Lee, Mann, Smith, McWilliams & Sweeney

[57] ABSTRACT

An image rotation circuit comprises a first-in-first-out memory (FIFO) for holding a block of data representing a portion of an image. Data is read out of the FIFO a word at a time, and written back into the FIFO with a displacement of one bit position. Thus, the data effectively travels around a spiral data path, producing a serial output stream. A shift register assembles the output data into words, representing the rotated image.

5 Claims, 2 Drawing Sheets (a) INITIAL IMAGE
(b) ROTATED COUNTER-CLOCKWISE
(c) ROTATED CLOCKWISE

IMAGE ROTATION CIRCUIT

This application is a continuation of application Ser. No. 104,504, filed Oct. 5, 1987 now abandoned.

FIELD OF THE INVENTION

This invention relates to an image rotation circuit for rotating an array of data representing an image or a portion of an image.

BACKGROUND TO INVENTION

It is known to store a digital image in the form of a bit map. Each bit represents the display value of a picture element (pixel) of the image. For example, each bit may indicate whether the corresponding pixel is black or white.

It is sometimes necessary to rotate such an image through 90°, either clockwise or counter-clockwise. For example, if an image is stored in "portrait" format (i.e. with its height greater than its width), it may be desired to rotate the image to allow it to be displayed on a screen with "landscape" format (i.e. with its width greater than its height).

Such a rotation can be performed purely by software means, by reading out each pixel value in turn and writing it into the appropriate locatin of the rotated image. However, this is a relatively slow process, since it requires each pixel to be handled seperately.

The object of the present invention is to provide a hardware rotation circuit which can assist such a rotation operation and hence allows it to be performed more rapidly.

SUMMARY OF THE INVENTION

According to the invention, there is provided an image rotation circuit for rotating a block of data representing at least a portion of an image, comprising:
(a) a first-in-first-out (FIFO) memory, for storing the block of data as a sequence of data words, each word having a plurality of bits, the FIFO having an input and an output,
(b) feedback means for connecting the output of the FIFO back to the input of the FIFO with a displacement of one bit position in a predetermined direction, to form a spiral data path,
(c) means for serially reading data bits from the spiral data path, one bit at a time, and
(d) output means for assembling the bits read from the spiral data path into output data words.

One image rotation circuit in accordance with the invention will now be described by way of example with reference to the accompanying drawings.

DESCRIPTION OF AN EMBODIMENT OF THE INVENTION

Figure 1:
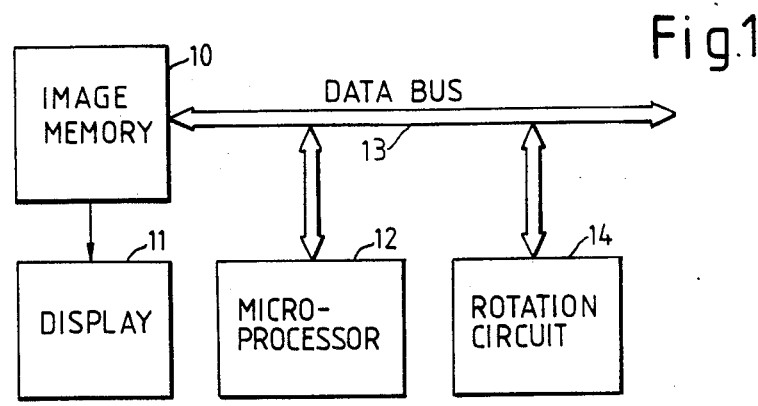
FIG. 1 is a block diagram of an image display system.

Referring to FIG. 1, the image display system comprises an image memory 10 for holding data representing one or more digital images. In operation, data is read out of the image memory in a specified sequence, and is used to provide a video signal for a display monitor 11.

The image memory, the display monitor, and the manner in which the image data is read out to produce the video signal, may all be conventional and so will not be described in any further detail.

The system also includes a microprocessor 12, which has access to the image memory 10 by way of a data bus 13. The data bus 13 carries 16 data bits D0–D15, allowing a 16-bit word to be transferred in parallel between the microprocessor and the image memory. In operation, the microprocessor accesses the image memory, so as to write new image data into it, or to modify existing images.

The microprocessor may be a standard unit: for example, it may comprise an Intel 80186 microrprocessor.

The system also includes a rotatin circuit 14, for performing image rotation operations on the data stored in the image memory. The rotation circuit is connected to the data bus 13 to allow data to be transferred directly between the image memory and the rotation circuit.

Figure 2:
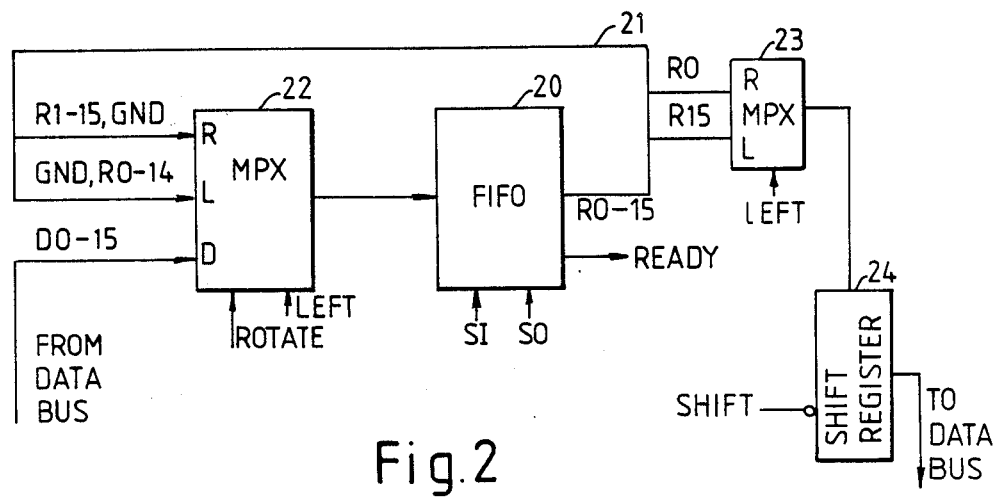
FIG. 2 is a circuit diagram of an image rotation circuit forming part of the display system.

Referring now to FIG. 2, this shows the rotation circuit 14 in detail.

The rotation circuit comprises a first-in-first-out (FIFO) memory 20, which holds up to 64 data words, each word consisting of 16 bits. A new word is loaded into the FIFO by a shift-in signal SI. When a word is ready at the output of the FIFO and rotation is enabled, a READY signal is produced, and the word can then be read out by means of a shift-out signal SO. The output of the FIFO is connected to a feedback data path 21, which carries sixteen data bits R0–R15 in parallel.

The data input of the FIFO is connected to the output of a 3-way multiplexer 22, having three 16-bit inputs D, L and R. The input D is connected to the data bus 13 and hence receives the data bits D–D15. The input L has its first bit connected to ground potential (zero volts) and its remaining fifteen bits connected to bits R0–R14 of the feedback path 21. The input R has its first fifteen bits connected to bits R1–R15 of the feedback path 21, and its sixteenth bit connected to ground potential.

The multiplexer 22 is controlled by two signals ROTATE and LEFT according to the following table.

| ROTATE | LEFT | OUTPUT |
|--------|------|--------|
| 1 | 0 | R |
| 1 | 1 | L |
| 0 | 0/1 | D |

Thus, when ROTATE is low, the multiplexer 22 connects the data bus 13 to the input of the FIFO. A LOAD signal from the processor is used to do the initial loading of the FIFO, prior to enabling rotation.

When ROTATE is high, the multiplexer selects data from the feedback path 21 for input to the FIFO. This feedback data is displaced by one bit position, either left or right according to the value of the signal LEFT. It can be seen that this effectively connects the individual bit locations of the FIFO into a spiral data path, data being shifted serially around the path by means of the signals SO and SI.

Bits R0 and R15 of the feedback path 21 are connected respectively to inputs R and L of a further multiplexer 23, controlled by the signal LEFT. When LEFT is high, the multiplexer 23 selects bit R15, and when LEFT is low, bit R0 is selected. It can be seen that the multiplexer 23 thus selects the last bit of the spiral data path through the FIFO.

The output of the multiplexer 23 is fed to the serial input of a 16-stage shift register 24. Data is shifted serially through the shift register under the control of a shift clock signal SHIFT. The sixteen stages of the shift register provide a 16-bit output word which is connected to the data bus 13.

Figure 3:
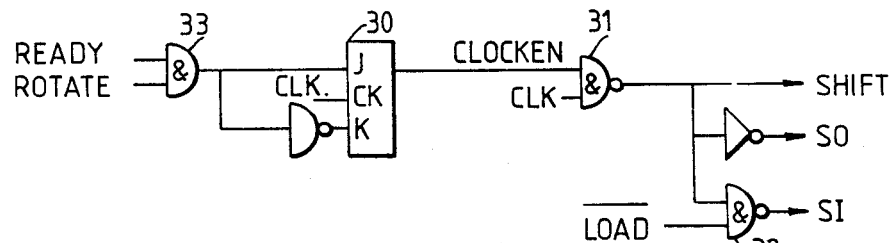
FIG. 3 shows a control circuit for the rotation circuit.

Referring now to FIG. 3, this shows the way in which the various control signals for the rotation circuit are generated.

When rotation is enabled and a data word is ready at the output of the FIFO, an AND gate 33 is enabled. This sets a J-K flip-flop 30 at the next beat of a clock signal CLK. Conversely, if READY or ROTATE is low, the flip-flop 30 is re-set at the next clock beat.

When the flip-flop 30 is set, it produces a signal CLOCKEN. This enables a NAND gate 31, allowing the clock signal CLK (inverted) to produce the SHIFT signal for the shift register. The output of the NAND gate is also inverted to produce the shift-out signal SO for the FIFO.

The shift-in signal SI is produced by a NAND gate 32 with two inputs, one of which receives the inverse of a LOAD signal, (generated from the CPU) and the other of which is connected to the output of the NAND gate 31.

The operation of the rotation circuit is as follows:

Data is initially loaded into the FIFO from the data bus 13. This is achieved by setting ROTATE low, and generating a sequence of LOAD signals. This produces a sequence of shift-in signals SI, so as to shift a sequence of data words into the FIFO.

When the data has been loaded into the FIFO, ROTATE is set high, and the READY signal is produced, and sets the flip-flop 30. This causes the signals SO, SI and SHIFT to be produced at each beat of clock CLK, so as to shift the data around the FIFO, and into the shift register 24.

Each 16 bit word assembled in the shaft register 24 is transferred in parallel to the image memory, over the data bus 13.

Figure 4:
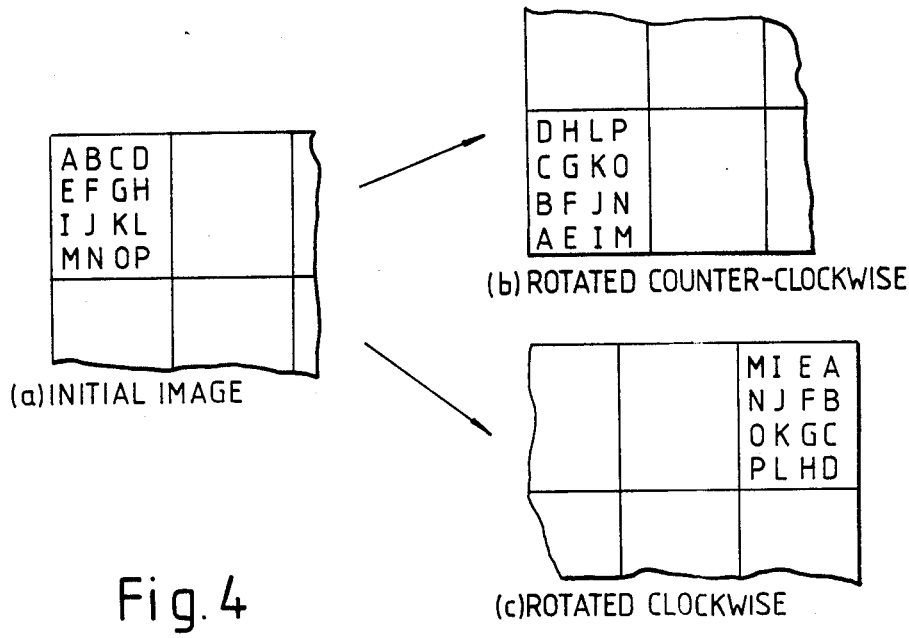
FIG. 4 illustrates the way in which data is rotated.

To assist with an understanding of the invention, an example of the operation of the rotation circuit will now be described, with reference to FIGS. 4-6. In this example a simplified system is assumed, in which each data word comprises four bits instead of sixteen.

The image is regarded as consisting of 4×4 blocks or pixels. For example, FIG. 4a shows one of there blocks in the top-left corner of the image. This block is stored in the image memory as four consecutive 4-bit data words:

| A B C D |
|---|
| E F G H |
| I J K L |
| M N O P |

Where each letter A-P represents a data bit.

In order to rotate the image 90°, each of the 4×4 blocks in read out in turn, rotated by 90° in the desired direction, and then written back into the appropriate location of the final rotated image.

Figure 5:
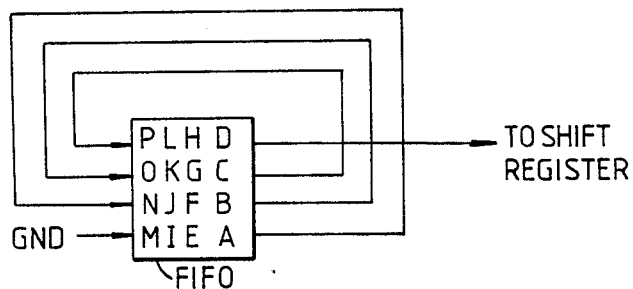
FIG. 5 illustrates the operation of the rotation circuit for counter-clockwise rotations.
Figure 6:
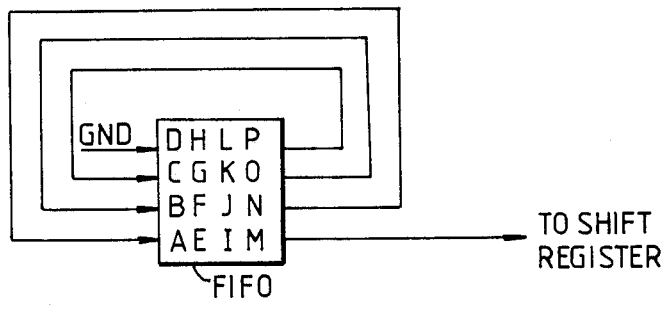
FIG. 6 illustrates the operation of the rotation circuit for clockwise rotations.

More specifically, counter-clockwise rotation is performed as follows:

Each word of the block in the top-left corner of the initial image (FIG. 4a) is read out in turn, starting with the first word ABCD, and written into the FIFO in the rotation circuit, as indicated in FIG. 5. The rotation circuit is then set into the rotate left mode (ROTATE=1, LEFT=1). This causes the FIFO to be connected to form a spiral data path as indicated in FIG. 5.

Thus, it can be seen that the data will be output to the shift register 24 in the following sequence:

D H L P C G K O B F J N A E I M

The shift register assembles this data into four words as follows:

| D H L P |
|---|
| C G K O |
| B F J N |
| A E I M |

These words are written in to the 4×4 block in the bottom-left corner of the final rotated image, as shown in FIG. 4b.

A similar operation is performed for each block in the image.

Clockwise rotation is performed as follows:

The block in the top-left corner of the initial image (FIG. 4a) is read out, a word at a time, in reverse order, starting with the last word MNOP. The words are written into the FIFO as shown in FIG. 6. The rotation circuit is then set into its rotate right mode (ROTATE=1, LEFT=0), causing the FIFO to be connected to form the spiral data path as indicated in FIG. 6.

Thus, it can be seen that the data read out of the FIFO to the shift register 24 in the following sequence:

M I E A N J F B O K G C P L H D

The shift register assembles this data into four words as follows:

| M I E A |
|---|
| N J F B |
| O K G C |
| P L H D |

These words are written in sequence into the 4×4 block in the top-right corner of the final rotated image, as shown in FIG. 4c.

Similar operations are performed for each 4×4 block in the image.

In the embodiment of the invention shown in FIGS. 1-3, the FIFO in the rotation circuit can hold up to three 16×16 blocks of data, allowing three such blocks to be rotated at the same time.

I claim:

1. An image rotation circuit for rotating a block of data representing at least a portion of am image, comprising:
    (a) a first-in-first-out (FIFO) memory, for storing the block of data as a sequence of data words, each word having a plurality of bits, the FIFO having an input and an output, (b) feedback means for connecting the output of the FIFO back to the input of the FIFO with a displacement of one bit position in a predetermined direction, to form a spiral serial data path, passing through all the bits in the FIFO, (c) means connected to one bit position of the output of the FIFO for serially reading data bits from the spiral serial data path, one bit at a time, and (d) output means for assembling the bits read from the spiral serial data path into output parallel data words.

2. A circuit according to claim 1 wherein said feedback means is selectively operable to displace each word by one bit position in either of two opposite directions.

3. A circuit according to claim 1 wherein said feedback means comprises a multiplexer having an output connected to the input of the FIFO, and having three inputs respectively connected to:
 (i) a data bus,
 (ii) the output of the FIFO, with a displacement of one bit position in a first direction, and
 (ii) the output of the FIFO, with a displacement of one bit position in a second direction.

4. A circuit according to claim 1 wherein said output means comprises a shift register.

5. Image display apparatus comprising:
(a) an image memory holding a plurality of data words, each word comprising a plurality of bits, each bit representing a display value for a picture element of the image,
(b) a first-in-first-out memory (FIFO) having an input and an output,
(c) means for reading a sequence of data words from the image memory into the FIFO,
(d) feedback means for connecting the output of the FIFO with a displacement of one bit position in a predetermined direction, to form a spiral data path, passing through all the bits in the FIFO,
(e) means connected to one bit position of the output of the FIFO for serially reading data from the spiral serial data path, one bit at a time,
(f) output means for assembling the bits read from the spiral serial data path into output parallel data words, and
(g) means for writing the output parallel data words into the image memory.

* * * * *